(12) United States Patent
Watfa et al.

(10) Patent No.: US 8,214,390 B2
(45) Date of Patent: Jul. 3, 2012

(54) BINARY INTEREST VECTOR FOR BETTER AUDIENCE TARGETING

(75) Inventors: Allie K. Watfa, Urbana, IL (US); Dale Nussel, Mahomet, IL (US)

(73) Assignee: Yahoo! Inc., Sunnyvale, CA (US)

( * ) Notice: Subject to any disclaimer, the term of this patent is extended or adjusted under 35 U.S.C. 154(b) by 442 days.

(21) Appl. No.: 12/477,815

(22) Filed: Jun. 3, 2009

(65) Prior Publication Data

US 2010/0313139 A1    Dec. 9, 2010

(51) Int. Cl.
*G06F 17/30* (2006.01)
(52) U.S. Cl. ........................................ 707/771; 707/756
(58) Field of Classification Search ........................ None
See application file for complete search history.

(56) References Cited

U.S. PATENT DOCUMENTS

| | | | | | |
|---|---|---|---|---|---|
| 3,581,290 | A | * | 5/1971 | Sugarman | 345/26 |
| 3,637,992 | A | * | 1/1972 | Ruesch | 235/445 |
| 3,697,949 | A | * | 10/1972 | Carter et al. | 714/763 |
| 3,735,363 | A | * | 5/1973 | Beers et al. | 712/205 |
| 3,757,307 | A | * | 9/1973 | Cosserat et al. | 710/262 |
| 3,763,477 | A | * | 10/1973 | Caron | 365/17 |
| 3,781,478 | A | * | 12/1973 | Blahut et al. | 370/458 |
| 3,793,488 | A | * | 2/1974 | King | 370/431 |
| 3,800,282 | A | * | 3/1974 | Acker | 382/182 |
| 3,858,187 | A | * | 12/1974 | Lighthall et al. | 365/202 |
| 3,925,762 | A | * | 12/1975 | Heitlinger et al. | 340/870.09 |
| 4,013,951 | A | * | 3/1977 | Ezoe et al. | 714/744 |
| 4,031,519 | A | * | 6/1977 | Findley | 358/1.11 |
| 4,074,228 | A | * | 2/1978 | Jonscher | 714/788 |
| 4,079,452 | A | * | 3/1978 | Larson et al. | 710/11 |
| 4,110,832 | A | * | 8/1978 | Leininger et al. | 708/708 |
| 4,129,888 | A | * | 12/1978 | Reinholtz | 360/40 |
| 4,163,229 | A | * | 7/1979 | Bodin et al. | 345/20 |
| 4,215,402 | A | * | 7/1980 | Mitchell et al. | 711/216 |
| 4,246,611 | A | * | 1/1981 | Davies | 348/734 |
| 4,287,559 | A | * | 9/1981 | Easley et al. | 712/234 |
| 4,302,999 | A | * | 12/1981 | Okumura | 84/605 |
| 4,314,356 | A | * | 2/1982 | Scarbrough | 1/1 |
| 4,616,564 | A | * | 10/1986 | Faddis et al. | 101/143 |
| 5,754,939 | A | * | 5/1998 | Herz et al. | 455/3.04 |
| 5,809,118 | A | * | 9/1998 | Carmello et al. | 379/102.02 |

(Continued)

OTHER PUBLICATIONS

"What are the different sections on the Search results page?" downloaded from the Internet on Aug. 31, 2009 < http://help.yahoo.com/l/us/yahoo/search/basics/basics-23.html > 3 pages.

(Continued)

*Primary Examiner* — Farhan Syed
(74) *Attorney, Agent, or Firm* — Hickman Palermo Truong Becker Bingham Wong LLP

(57) ABSTRACT

A binary interest vector is herein described, which represents information in a string of bits about user interest in a set of topics. The binary interest vector may represent the interests of a particular user, or the interests of users associated with a particular client machine. Such a binary interest vector can store a large amount of information in a very small space by assigning bit subsets of the string of bits to represent interest in respective topics of the set of topics based on the positions of the bits in the subsets. Additionally, the bits of a particular binary interest vector may include a version indicator identifying the pattern of topics assigned to the bits of the particular vector. The user interest information in a particular binary interest vector may be utilized in selecting content to display to the user that is associated with the particular vector.

24 Claims, 12 Drawing Sheets

U.S. PATENT DOCUMENTS

| | | | |
|---|---|---|---|
| 5,815,665 A * | 9/1998 | Teper et al. | 709/229 |
| 5,835,087 A * | 11/1998 | Herz et al. | 715/810 |
| 5,848,415 A * | 12/1998 | Guck | 707/831 |
| 5,869,819 A * | 2/1999 | Knowles et al. | 235/375 |
| 5,873,100 A * | 2/1999 | Adams et al. | 1/1 |
| 5,874,953 A * | 2/1999 | Webster et al. | 715/733 |
| 5,911,776 A * | 6/1999 | Guck | 709/217 |
| 5,963,951 A * | 10/1999 | Collins | 1/1 |
| 5,983,268 A * | 11/1999 | Freivald et al. | 709/218 |
| 5,992,752 A * | 11/1999 | Wilz et al. | 235/472.01 |
| 6,002,871 A * | 12/1999 | Duggan et al. | 717/135 |
| 6,024,553 A * | 2/2000 | Shimalla | 425/290 |
| 6,045,048 A * | 4/2000 | Wilz et al. | 235/472.01 |
| 6,068,188 A * | 5/2000 | Knowles | 235/462.01 |
| 6,076,733 A * | 6/2000 | Wilz et al. | 235/462.01 |
| 6,085,324 A * | 7/2000 | Ogram | 726/5 |
| 6,134,552 A * | 10/2000 | Fritz et al. | 1/1 |
| 6,152,369 A * | 11/2000 | Wilz et al. | 235/462.01 |
| 6,175,830 B1 * | 1/2001 | Maynard | 1/1 |
| 6,182,097 B1 * | 1/2001 | Hansen et al. | 715/234 |
| 6,182,129 B1 * | 1/2001 | Rowe et al. | 709/221 |
| 6,199,077 B1 * | 3/2001 | Inala et al. | 715/201 |
| 6,205,413 B1 * | 3/2001 | Bisdikian et al. | 703/24 |
| 6,263,371 B1 * | 7/2001 | Geagan et al. | 709/231 |
| 7,987,182 B2 * | 7/2011 | Slothouber et al. | 707/722 |
| 2003/0187774 A1 * | 10/2003 | Kummamuru et al. | 705/37 |
| 2007/0078849 A1 * | 4/2007 | Slothouber | 707/5 |
| 2009/0037514 A1 * | 2/2009 | Lankford et al. | 709/201 |
| 2009/0132368 A1 * | 5/2009 | Cotter et al. | 705/14 |
| 2010/0217660 A1 * | 8/2010 | Biswas | 705/14.38 |
| 2010/0313139 A1 * | 12/2010 | Watfa et al. | 715/745 |

OTHER PUBLICATIONS

"Yahoo! Mobile web" downloaded from the Internet on Aug. 31, 2009 < http://mobile.yahoo.com/yahoo/browser > 1 page.

"Yahoo Mail Classic" downloaded from the Internet on Aug. 31, 2009 < http://overview.mail.yahoo.com/products/classic > 2 pages.

"New Yahoo! Mail" downloaded from the Internet on Aug. 31, 2009 < http://overview.mail..yahoo.com/producs/new > 2 pages.

"Yahoo! Privacy Center" downloaded from the Internet on Aug. 31, 2009 < http://info.yahoo.com/privacy/us/yahoo/details.html > 2 pages.

* cited by examiner

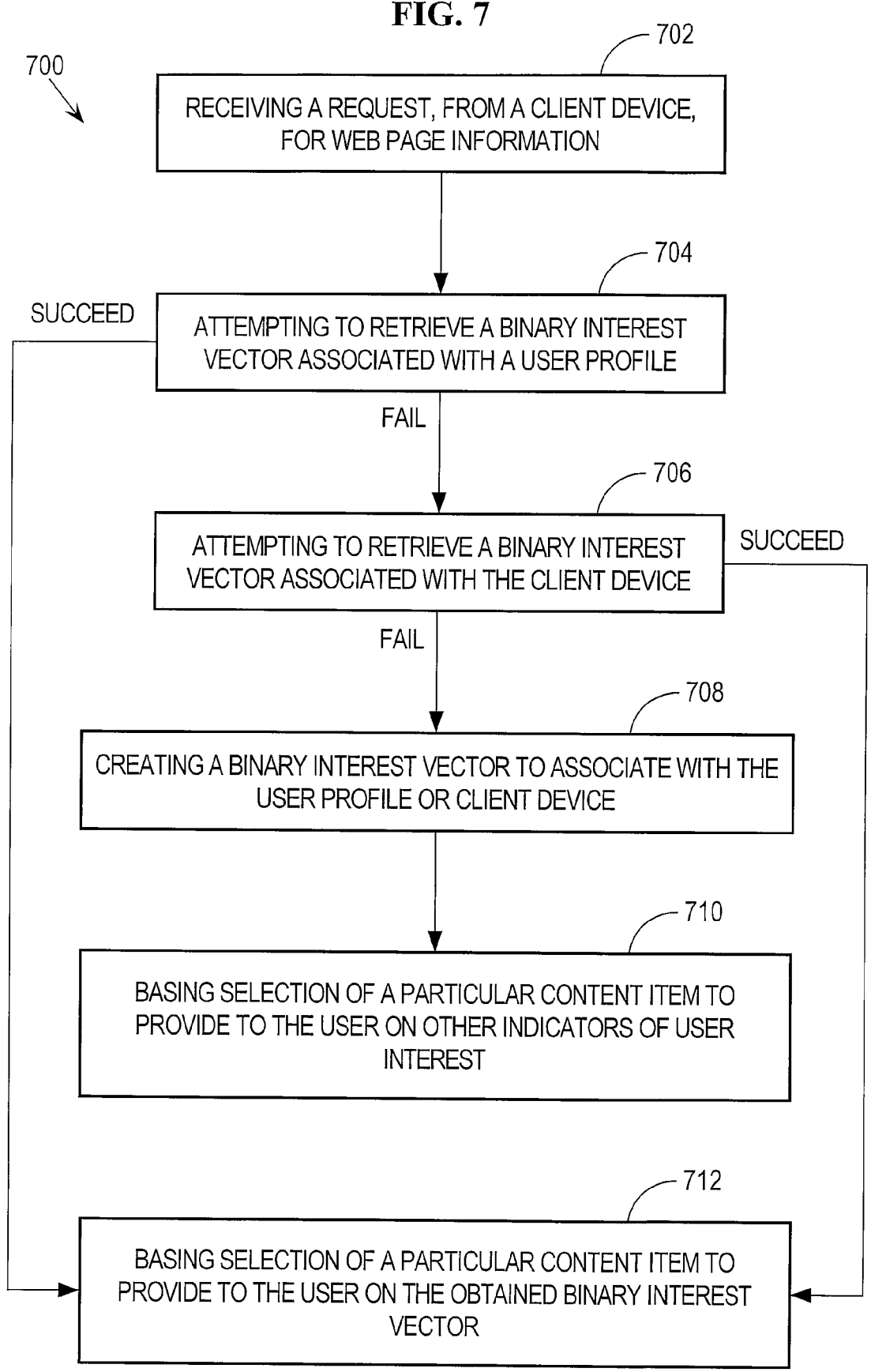

FIG. 11
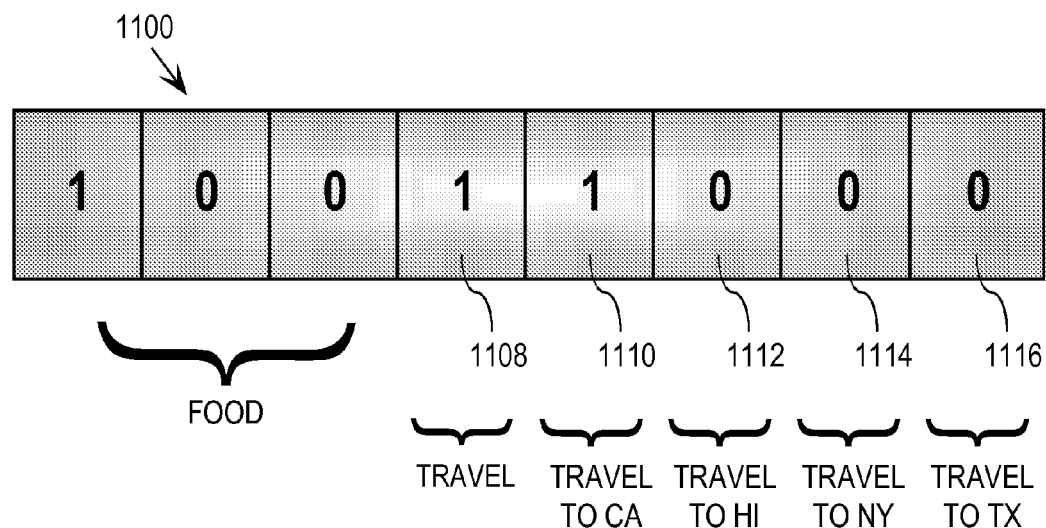
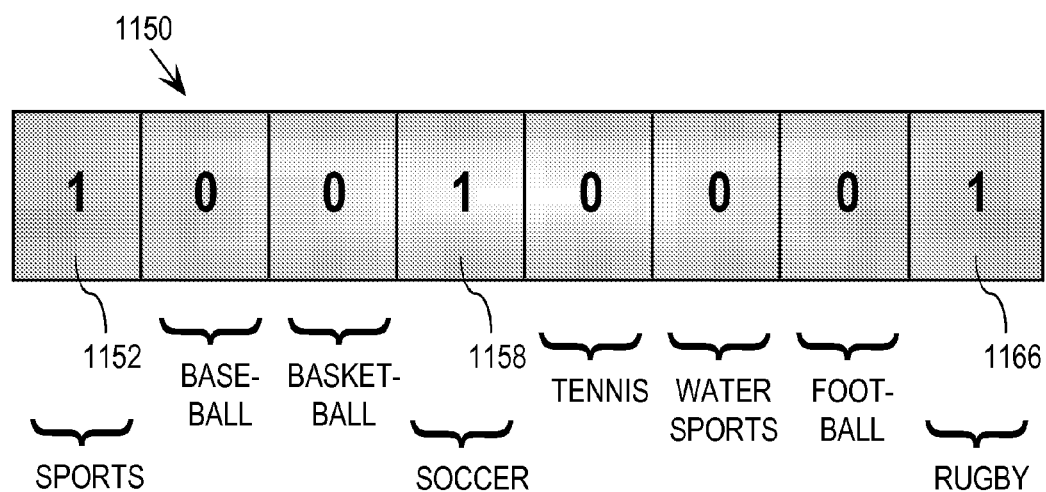

BINARY INTEREST VECTOR FOR BETTER AUDIENCE TARGETING

FIELD OF THE INVENTION

The present invention relates to recording user interest, and more specifically, to recording such interest with a compact and dynamic data structure.

BACKGROUND

The most widely used part of the Internet is the World Wide Web, often abbreviated "WWW" or simply referred to as just "the Web." The Web is an Internet service that organizes information through the use of hypermedia. Hypermedia documents that are accessible over the Web, or Web pages, present information on a myriad of topics.

FIG. 1 illustrates an example configuration 100 of devices through which a user may access Web pages over the Web. According to example configuration 100, client device 102, which includes Web browser 104 and display device 106, is connected to network 110. Also connected to network 110 is server device 120, which includes Web server 122. Web server 122 has access to information for Web page 124.

To access Web page 124, a user of client device 102 directs Web browser 104 to request Web page 124. Web browser 104 sends a request to view Web page 124 via network 110 to Web server 122 on server device 120. Web server 122 receives the request and sends the information for Web page 124 to client device 102. Web browser 104 interprets the information for Web page 124 and then causes Web page 124 to be displayed on display device 106. The user may browse for additional Web pages by selecting links that are embedded in Web page 124. Selecting such links causes Web browser 104 to issue requests for information corresponding to the links from appropriate Web servers.

According to established Internet custom, users may access many Web pages without charge. One way that Web page providers ("providers") make money from Web pages that users view without charge is by including paid advertisements in the pages. Such advertisements generally include links to Web pages containing information on advertised products or services. If a provider has more than one advertisement available to display on a particular Web page, the provider may attempt to select an advertisement for display that is in line with the viewing user's interests. Tailoring the content of advertisements to user interests increases the probability that the user will select the advertised links.

Providers can determine the interests of users in many ways, e.g., through information provided by the user in a user profile, by observing the browsing history of the user, by observing search queries performed by the user, etc. A provider may record such interest information and refine the information over time to tailor content presentation to the interests of the users more accurately.

One way that Web page providers record the interests of users is through Internet "cookies". A cookie is a string that a Web server may cause to be stored on a client device. Through a cookie, the Web server may store information on the client machine. The client device automatically returns the cookie to the Web server when the client requests information from the server. For example, when a user on client device 102 views Web page 124, Web server 122 may provide a cookie to client device 102 along with the requested data. Web browser 104 returns the cookie with future requests to Web server 122. Web server 122 may include, in a cookie on client device 102, the Web pages that a particular user of client device 102 views. The interests of the user may be inferred from this list of Web pages.

Thus, a Web server may track various indicia of user interest through cookies. However, because cookies are stored on client machines, a Web server cannot access cookie information about a particular user stored at one client machine when that particular user views Web pages from a second client machine. Also, users have the option of clearing all stored cookies from a client machine, which reduces the effectiveness of storing user interest data in cookies.

Furthermore, the content of a cookie may become increasingly large as data is gathered about the user and stored in the cookie. Client machines that are capable of accessing the Internet are becoming smaller with more limited resources, i.e., smart phones, personal digital assistants (PDAs), etc. Transferring and storing bulky cookies on such small devices can reduce the speed with which these devices can process Web pages.

Another way to tailor the presentation of content to the interests of a particular user is to maintain a history of user interest in a database. For example, a provider of Web content that is interested in tailoring presented content to the interests of a user may request that the user create and fill out a user profile. Then, the provider may track information about the user through the user profile and employ that information in selecting content to provide to the user. For example, the provider may record the Web pages that the user views when the user is logged into the user profile, infer the interests of the user from the Web pages that the user views, and select content based on those inferred interests.

Additionally, a provider may analyze trends in information gathered through a multitude of user profiles, or other information sources, to determine rules to govern the determination of user interest in particular topics. For example, a provider may perceive a trend that indicates that people who view Web pages about cars are generally also interested in soft drinks. Providers may use the information gathered through the user profiles as well as the rules based on information trends to tailor the presentation of content to individual users.

However, databases that store such information are generally large and complex, and it may be expensive to extract and analyze the information. Also, if a user fails to log into her corresponding user profile when the user browses the Internet, the provider cannot connect the user with the user's profile. Thus, the utility of gathering information about the user through profiles is limited. Furthermore, tracking user interest in this manner can cause a large amount of data to be transferred between client machines and servers, which can cause performance problems on small devices such as smart phones and PDAs, as described above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates an example method of retrieving a binary interest vector in response to a user request to view Web page information;

FIG. 11 is a block diagram that illustrates example versions of binary interest vectors.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. GENERAL OVERVIEW
    II. STRUCTURE
    III. ASSOCIATED ENTITIES
    IV. DISPLAYING CONTENT
    V. STORAGE
        A. BINARY INTEREST VECTOR RETRIEVAL
        B. UPDATING THE STRUCTURE
        C. VERSIONING
        D. OVERWRITES AND PRIVACY
    VI. UPDATING USER INTEREST
    VII. ALTERNATIVE IMPLEMENTATIONS
    VIII. HARDWARE OVERVIEW

I. General Overview

A binary interest vector is herein described, which represents information in a string of bits about user interest in a set of topics. The binary interest vector may represent the interests of a particular user, or the interests of users associated with a particular client machine. Thus, the binary interest vector may be stored in connection with a user profile, or in connection with a client machine, etc. Such a binary interest vector can store a large amount of information in a very small space by assigning bit subsets of the string of bits to represent interest in respective topics of the set of topics based on the positions of the bits in the subsets. Additionally, the bits of a particular binary interest vector may include a version indicator identifying the pattern of topics assigned to the bits of the particular vector.

Figure 1:
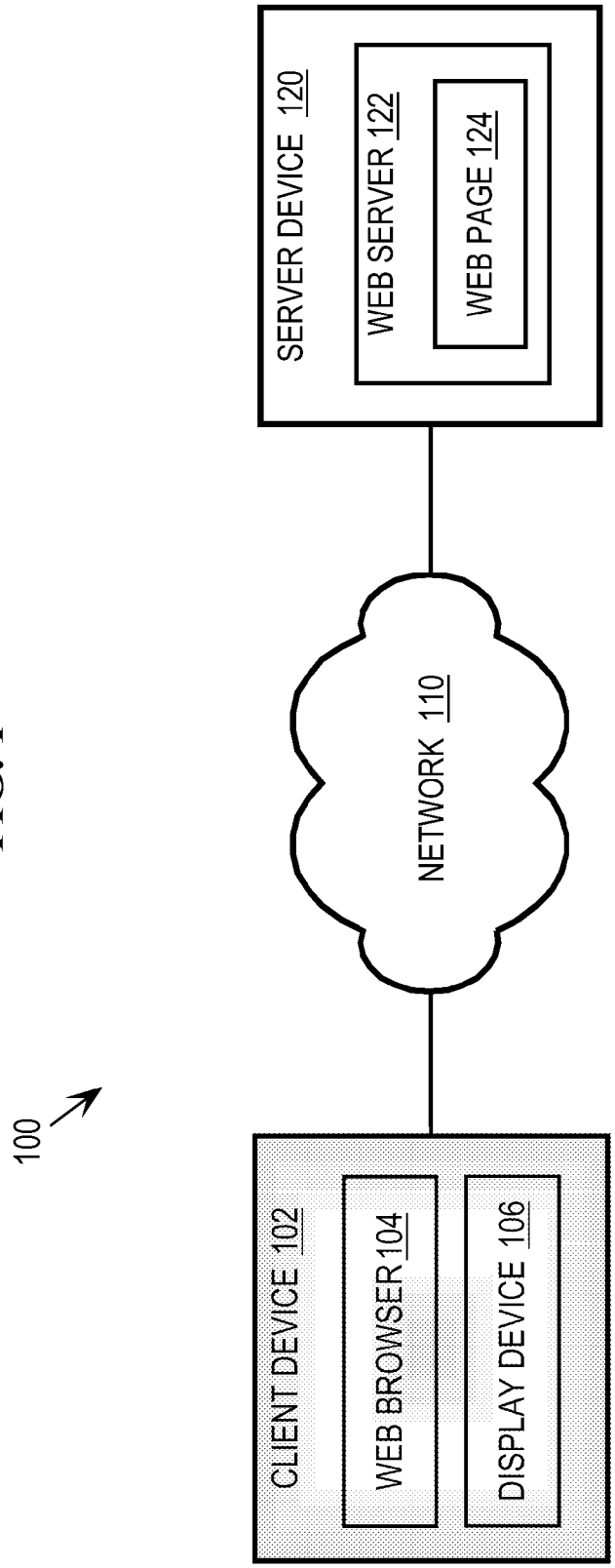
FIG. 1 is a block diagram illustrating an example configuration of devices through which a user may access Web pages.
Figure 2:
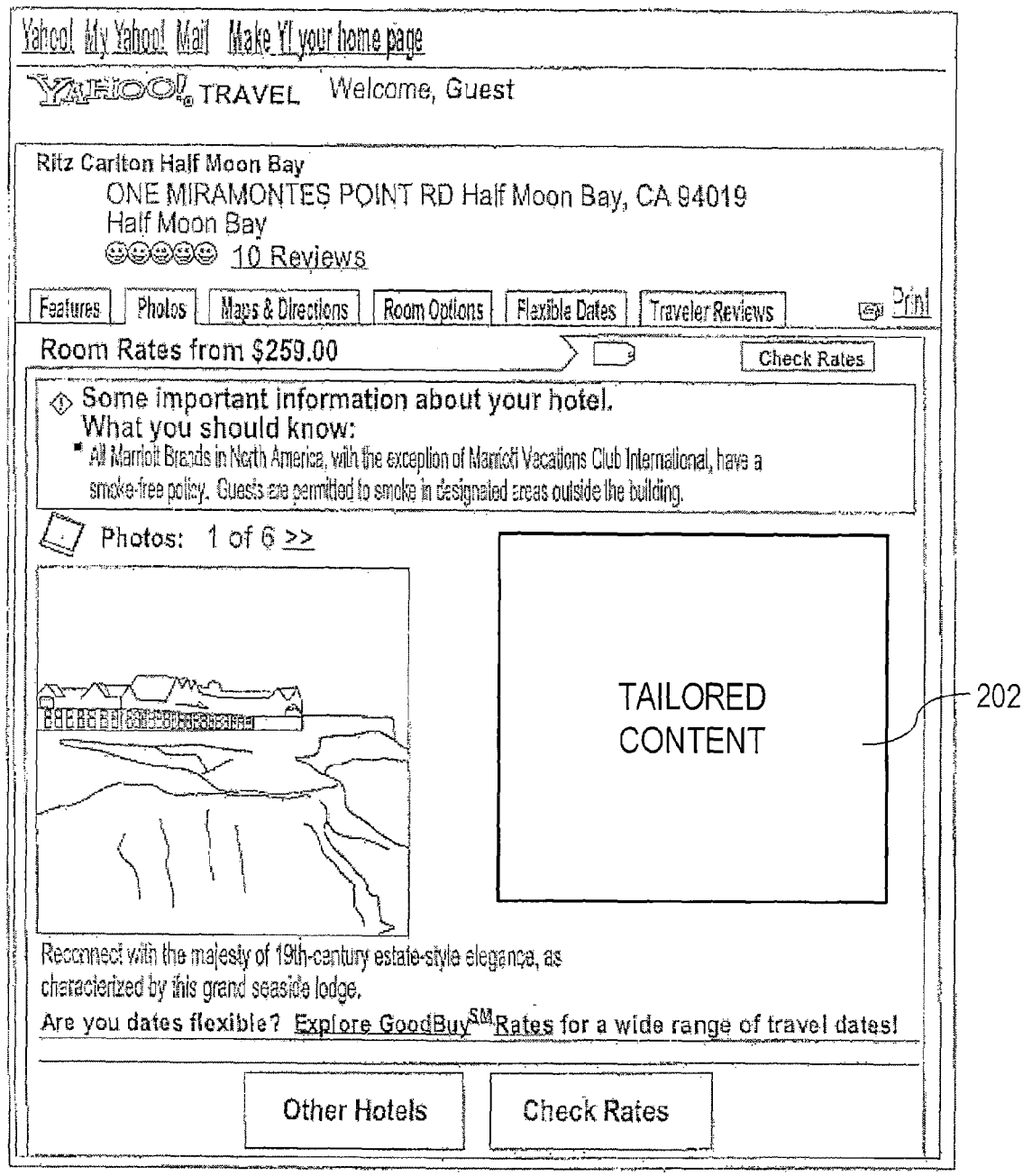
FIG. 2 illustrates an example Web page with a spot for tailored content.

The user interest information in a particular binary interest vector may be utilized in selecting content, tailored to a user's interest, to display to the user that is associated with the particular vector. FIG. 2 illustrates an example Web page 200 with a spot for tailored content 202. In the context of example Web page 200, a provider may select content to display at the spot for tailored content 202 based on a binary interest vector. Such tailored content may be an advertisement, or any other kind of content. Tailored content may also be displayed with internet content other than Web pages, such as emails, etc. Furthermore, when selecting content to display to the user, the values represented by a binary interest vector may be assigned weights to adjust the significance of user interest in certain topics represented by the vector.

II. Structure

A binary interest vector is a compact and dynamic record of user interest in a set of topics using a sequence of bits, including any quantity of bits. A subset of bits in the binary interest vector is assigned to each topic of the set of topics based on the positions of the bits in the subset.

Figure 3:
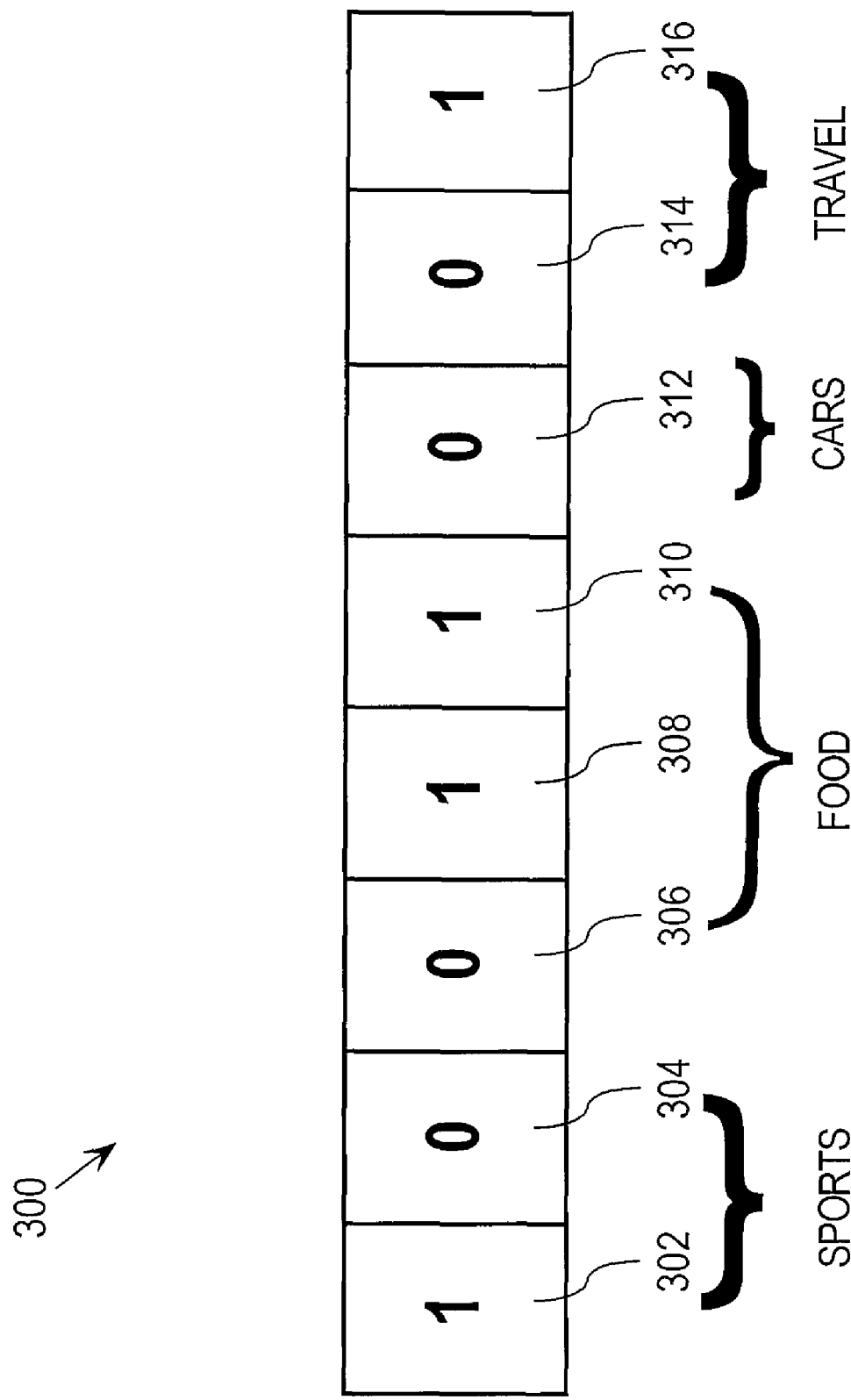
FIG. 3 is a block diagram illustrating an example binary interest vector.

An example binary interest vector 300 is illustrated in FIG. 3. For the purposes of explanation, binary interest vector 300 is composed of a set of eight bits 302-316. According to one embodiment of the invention, subsets of bits 302-316 are associated with respective topics based on the position of each respective bit. The values of the bits corresponding to a particular topic indicate a level of interest in the particular topic.

If only one bit is assigned to a particular topic, then a value of 1 indicates interest in the particular topic, and a value of 0 indicates no interest in the particular topic. If two or more bits are used to indicate interest in a particular topic, then the values of the bits are combined in any number of ways to determine a level of interest in the particular topic. For example, bits may be concatenated in linear order and the resulting binary number may be interpreted as the interest level in the particular topic, or the bits may be added together to determine a decimal interest level in the topic, etc. Thus, the level of interest in the topic manifest by two or more bits may take on values that range wider than 0 and 1.

In the example of binary interest vector 300, the vector contains only 8 bits. The first two bits are dedicated to the topic "sports", the next three bits are dedicated to "food", the next bit is dedicated to "cars", and the final two bits are dedicated to "travel". For convenience, it is said that binary interest vector 300 conforms to the following template: 8 bits: sports—2 bits; food—3 bits; cars—1 bit; travel—2 bits. While the bits corresponding to a particular topic in binary interest vector 300 are adjacent bits, bits from any location in a binary interest vector may represent a particular topic within the embodiments of the invention.

In this example, the bits of binary interest vector 300 are concatenated linearly and are interpreted as representing a numerical interest level for purposes of illustration. In binary interest vector 300, bits 302 and 304 are associated with "sports". When concatenated in linear order, bits 302 and 304 form the binary number 10. As is well known in the art, the binary number 10 is equivalent to the decimal number 2. Thus, bits 302 and 304 may indicate an interest level of 2 in sports. Further, bits 306-310 are associated with "food", and represent a binary interest level of 011 in food, which translates to a decimal interest level of 3. The value, 0, of bit 312 associated with "cars" represents no interest in cars. The concatenated value, 01, of bits 314 and 316 also represent a decimal interest level of 1 in "travel".

Topics may be assigned to the bits of a binary interest vector as desired by a provider. Also, the bits of a binary interest vector may convey information other than information on topics in which a user has manifested interest, such as attributes or preferences of the user, attributes of the client machine, or other information.

III. Associated Entities

Figure 4:
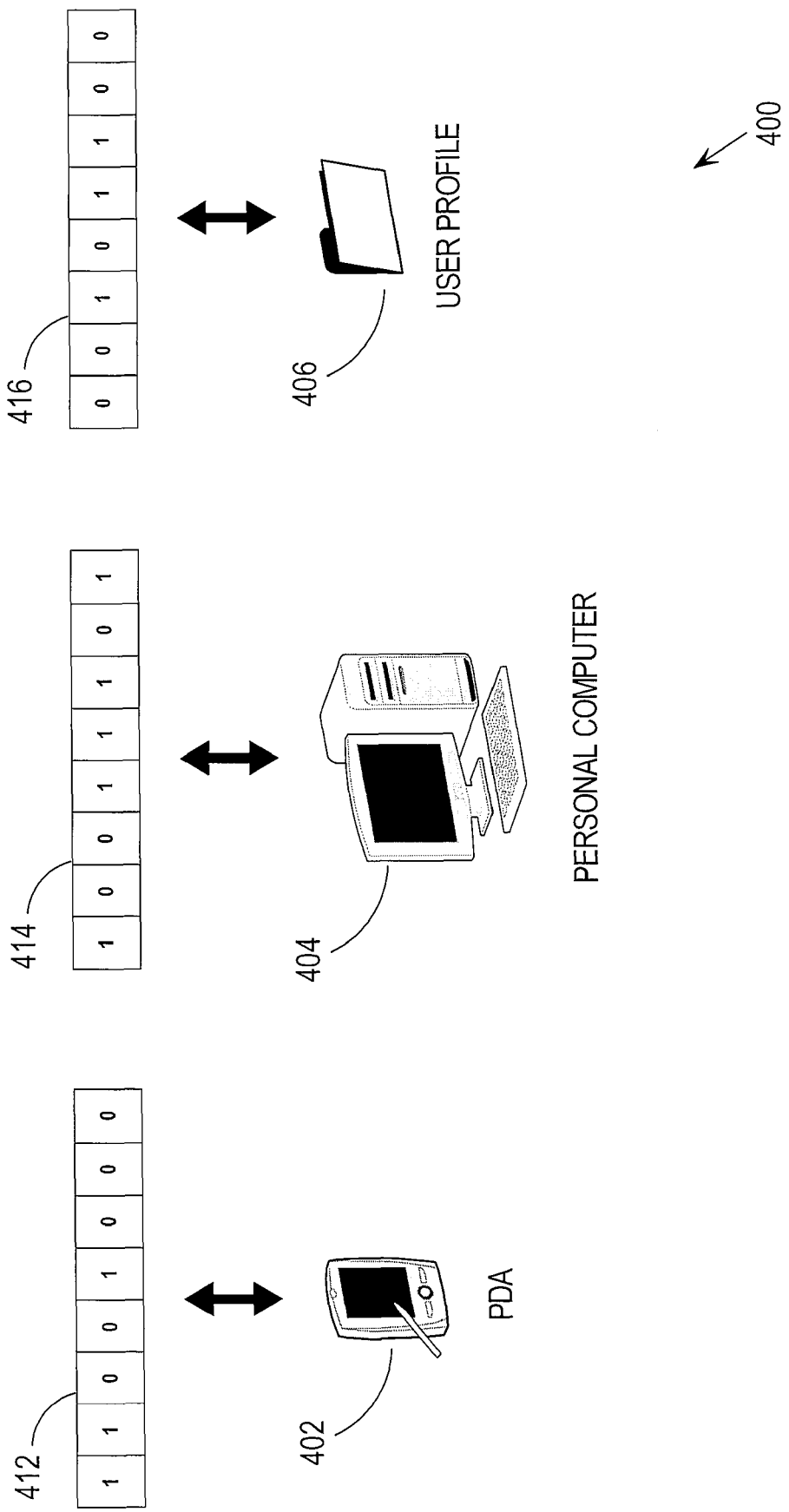
FIG. 4 is a block diagram that illustrates an example configuration of binary interest vectors associated with various entities.

In one embodiment of the invention, a binary interest vector describes the interests of users associated with a particular entity, such as a user profile or a client machine. FIG. 4 illustrates an example configuration 400 of binary interest vectors associated with various entities. Personal digital assistant (PDA) 402 is associated with binary interest vector 412, personal computer (PC) 404 is associated with binary interest vector 414, and user profile 406 is associated with binary interest vector 416. A binary interest vector may be associated with a device using a unique identifier for the device, such as a Media Access Control (MAC) address or an Internet Protocol (IP) address associated with the device. Each of binary interest vectors 412-416 represents the interests of users associated with PDA 402, PC 404, and user profile 406, respectively. Binary interest vector 416 generally reflects interest information for only the user associated with user profile 406. In contrast, binary interest vectors associated with devices, such as binary interest vectors 412 and 414, may represent interest information for all of the users that access the internet through the associated device.

When a particular user uses the Internet through PDA 402, the user may express interest in a particular topic by browsing to a particular Web page, or by entering a particular search query, etc., as described in more detail below. A provider may update binary interest vector 412 to reflect the interests manifest by users of PDA 402. Further, the provider may select content to display to users of the PDA based on binary interest vector 412. When a particular user uses the Internet through PC 404, the provider may utilize binary interest vector 414 in a similar manner.

Because many different users may have access to PDA 402 or PC 404, binary interest vectors 412 and 414 may reflect the interests of these multiple users. Therefore, in one embodiment of the invention, if a binary interest vector associated with a user profile is available, then the information in that binary interest vector is used before information in a binary interest vector associated with a device. Information from a binary interest vector for a user profile is preferred because when the provider selects content to display to the particular user based on such information, the content is more likely to be suited to the particular user's interests. However, if a binary interest vector associated with a user profile is not available, either because the user is not logged into a profile, or the activated user profile does not have an associated binary interest vector, then a binary interest vector associated with the client device is utilized, if available.

IV. Displaying Content

A provider of Web content may base the presentation of content on the information represented in a binary interest vector. For purposes of explanation, certain embodiments of this invention are described with respect to selecting advertising content to present to users. However, any kind of content may be selected based on the information in a binary interest vector, as described in further detail below.

When a user requests Web page 200 of FIG. 2, the Web content provider selects content to display in the spot for tailored content 202. For example, a provider may have two or more content items available to display as a part of Web page 200. User interests recorded in a binary interest vector associated with the user profile or client device of the user aids the provider in selecting content to display as tailored content 202 that is likely to be interesting to the user.

Figure 5:
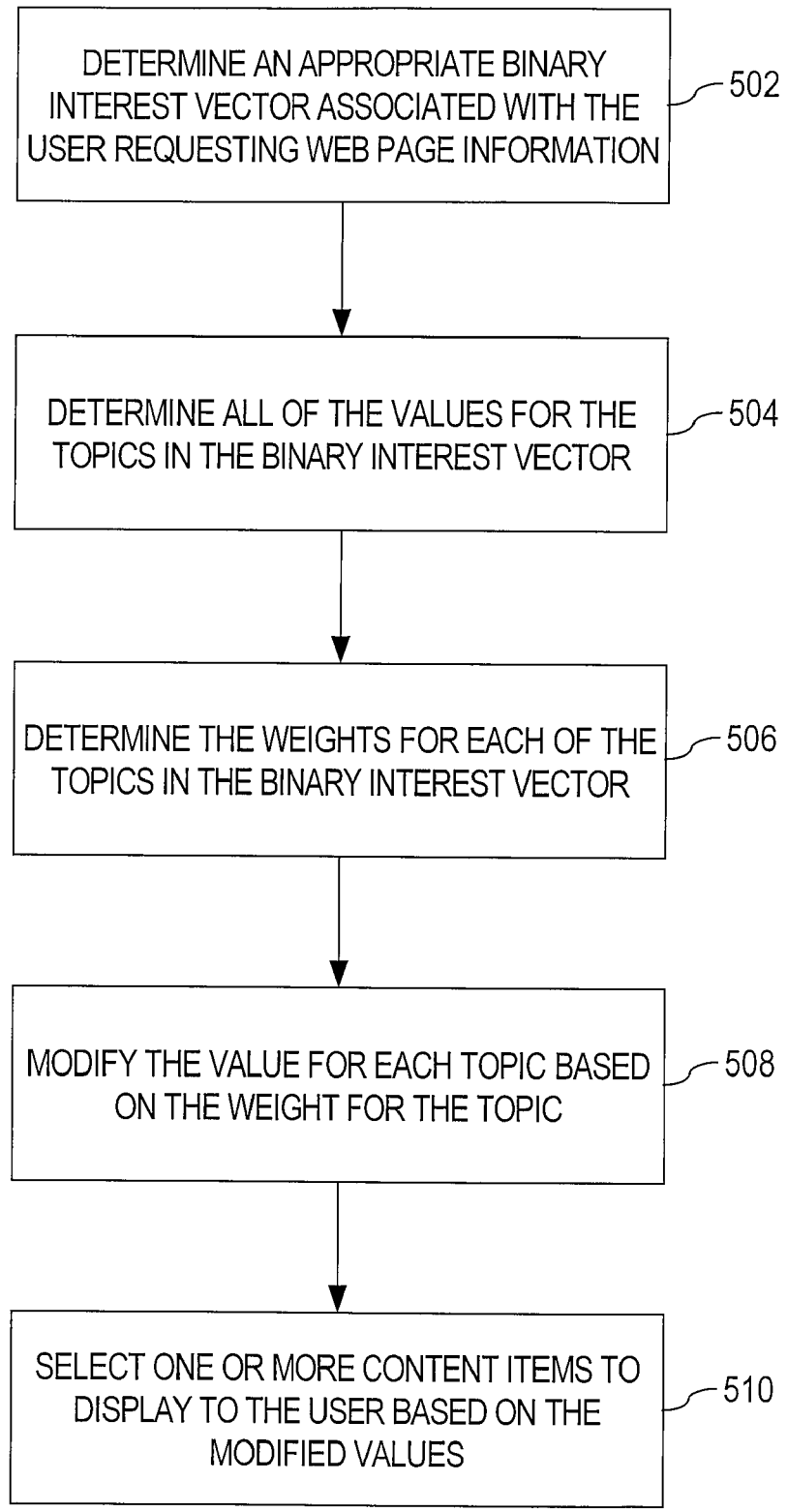
FIG. 5 illustrates an example method for selecting content to display to a user based on a binary interest vector.

FIG. 5 illustrates an example method 500 for selecting content to display to a user based on a binary interest vector. At step 502, an appropriate binary interest vector associated with the user requesting Web page information is determined. For example, if a particular user requests Web page 200 (FIG. 2) from a Web server, the Web server may attempt to locate a binary interest vector associated with the user. The Web server may first determine if the user is logged into a user profile, and if so, the Web server may determine whether a binary interest vector is associated with the user profile. If no binary interest vector is associated with the user profile, then the Web server may determine whether a binary interest vector is associated with the client machine of the user. In this example, the Web server determines that binary interest vector 300 (FIG. 3) is the appropriate binary interest vector to use in selecting content for the user.

At step 504, all of the values for the topics in the binary interest vector are determined. For example, as previously indicated, binary interest vector 300 conforms to the template: 8 bits: sports—2 bits; food—3 bits; cars—1 bit; travel—2 bits. Thus, sports has a binary value of 10 and a decimal value of 2, food has a binary value of 011 and a decimal value of 3, cars has a value of 0, and travel has a value of 01 and a decimal value of 1.

At step 506, the weights for each of the topics in the binary interest vector are determined. A provider may provide weights for each topic in a binary interest vector to adjust the influence each topic has on the final selection of content. Such weights may be the same across all pages and users, or may be customized for various pages and/or users. Weights may be adjusted based on information known about the user, the client machine, or based on the other content in the Web page in which the tailored content will be displayed. For example, when selecting content for the spot for tailored content 202 in Web page 200, a provider may weight the value of "travel" more heavily than other topics because Web page 200 is closely related to travel. Weights may also be adjusted based on the viewing history of the user, etc. Thus, the weights applied to the binary interest vector values may be dynamically adjusted by a provider without adjusting the structure of the binary interest vector itself. In the context of the previous example of binary interest vector 300, "sports" and "cars" are associated with a weight of 1, "food" is associated with a weight of 1.5, and "travel" is associated with a weight of 3.

At step 508, the value for each topic is modified based on the weight for the topic. In one embodiment of the invention, values represented in a binary interest vector are modified by multiplying the values by their corresponding weights. However, other methods of modifying binary interest vector values based on weights may be employed within the embodiments of the invention. Continuing with the previous example, the modified values of binary interest vector 300 are as follows: sports, 2*1=2; food, 3*1.5=4.5; cars, 0*1=0; and travel, 1*3=3.

In another embodiment of the invention, a provider may also normalize the modified interest values to allow for varying ranges of values possible for the topics. For example, because two bits are available to represent an interest value in sports and three bits are available to represent food, an interest value of 1 in sports is not necessarily equivalent to an interest value of 1 in food. A value for a particular topic may be normalized according to the following Eq. 1:

$$(x_t+1)/R_t \qquad \text{Eq. 1}$$

where $x_t$ denotes the value associate with topic t in a binary interest vector, and $R_t$ denotes the range of values that can be represented by the bits associated with topic t.

For example, if sports is represented by two bits, then the range of the bits for sports is four because two bits can represent exactly four distinct values: 0, 1, 2, and 3. Therefore, because the initial modified value for sports in binary interest vector 300 is 2, then the normalized modified value for sports in binary interest vector 300 is (2+1)/4, which equals 0.75. Using the same normalization technique, the normalized modified value of food for binary interest vector 300, which is represented by three bits with a range of 8, is (4.5+1)/8, which equals approximately 0.69. The normalized modified value for travel is (3+1)/4, which equals 1.0. The normalized modified values for cars continues to be 0. Preferably, the modified values are not saved to the binary interest vector, to allow different weights to be applied in the future. Furthermore, a provider may normalize or weight topics corresponding to only one bit in a different manner than topics corresponding to two or more bits. Depending on the weight applied to a particular value, the corresponding modified and normalized value may exceed 1. For purposes of this explanation, normalization is considered part of modifying the values.

At step 510, one or more content items are selected to display to the user based on the modified values. For example, if there is only one spot for content, then the topic with the highest modified value may determine which content item is selected for the spot. In the example of binary interest vector 300, a provider may select an advertisement relating to the topic with the highest modified value, which is "travel", with a modified normalized score of 1.0. More than one modified value may also be considered in selecting content. Furthermore, other information in addition to a binary interest vector may also be considered in selecting content, such as the browsing history for the user in the particular session.

A provider may also order the topics of a binary interest vector such that the topic that is most important to the provider is represented by the first bits of the vector, and the topic that is second-most important to the provider is represented by the second bits of the vector, and so on. Thus, a provider may encode weights into the binary interest vector.

V. Storage

Figure 6:
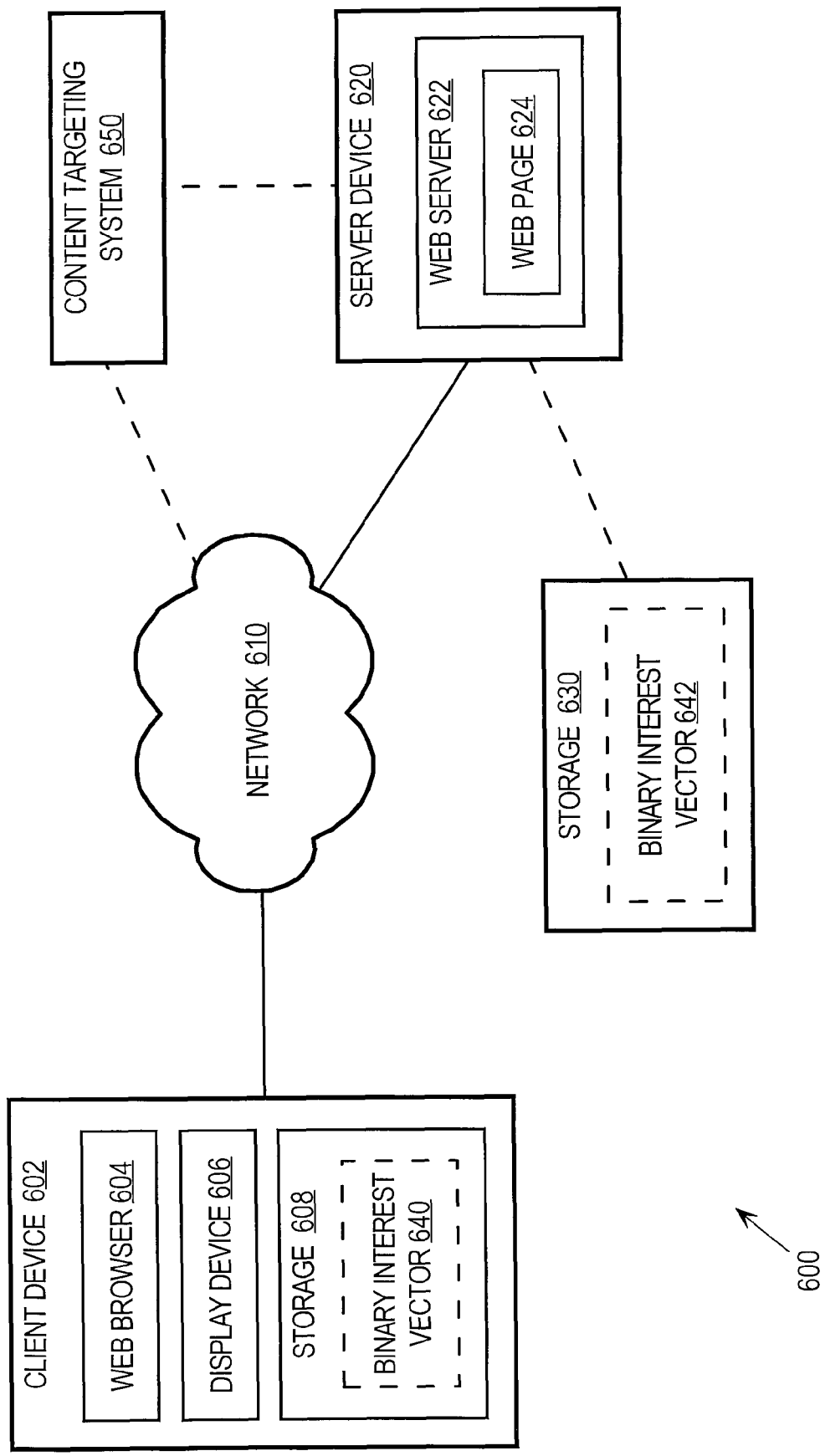
FIG. 6 is a block diagram that illustrates an example network arrangement on which embodiments of the invention may be implemented.

A binary interest vector may be stored at a client device such as PDA 402 or PC 404 (FIG. 4), or may be stored remotely from a client device, such as on a server. FIG. 6 is a block diagram that illustrates an example network arrangement 600 on which embodiments of the invention may be implemented. Network arrangement 600 includes a client device 602, and a server device 620, communicatively coupled via network 610.

Client device 602 may be implemented by any type of client device. Example implementations of client device 602 include, without limitation, workstations, personal computers, laptop computers, personal digital assistants (PDAs), cellular telephony devices, and any type of mobile devices. In example network arrangement 600, client device 602 is configured with a Web browser 604, a display device 606, and storage 608. Web browser 604 may be any type of Web browsing application that interprets Web page information. Display device 606 may be implemented by any type of device that is capable of visually displaying data from client device 602. Storage 608 may be implemented by any type of storage, including volatile and non-volatile storage. Examples of storage 608 include, without limitation, random access memory (RAM) and one or more disks. Client device 602 may be configured with other mechanisms, processes, and functionality, depending upon a particular implementation.

Server device 620 may be implemented by any type of device that is capable of communicating with client device 602 over network 610. In example network arrangement 600, server device 620 includes Web server 622, which has access to information for Web page 624. Web server 622 may be implemented by any application able to serve information for Web pages, such as Web page 624, over network 610 in response to a client request, such as from client device 602. Server device 620 may be configured with other mechanisms, processes and functionality, depending upon a particular implementation, and the approach described herein Server device 620 has access to storage 630, which may be implemented by any type of storage, including volatile and non-volatile storage. Examples of storage 630 include, without limitation, random access memory (RAM) and one or more disks. Storage 630 may be implemented in a device distinct from server device 620, or may be integrated with server device 620.

In example network arrangement 600, storage 608 may include binary interest vector 640, and storage 630 may include binary interest vector 642, according to certain embodiments of the invention. Specifically, binary interest vectors that are associated with a client device or a user profile may be stored either at a client device, e.g., as a cookie, or at a server device, or at both places, depending on the implementation of the embodiments of the invention.

Server device 620 also has access to content targeting system 650, either directly, or through network 610. Parts of content targeting system 650, or the whole of content targeting system 650, may be integrated with server device 620, or may be implemented independently of server device 620. For example, content targeting system 650 may be implemented by one or more processes running on server device 620. Alternatively, all or part of content targeting system 650 may be implemented by one or more processes running on another device that is accessible to server device 620, either directly, or over network 610.

Network 610 may be implemented with any type of medium and/or mechanism that facilitates the exchange of information between client device 602 and server device 620. Furthermore, network 610 may use any type of communications protocol and may be secured or unsecured, depending upon the requirements of a particular application. The embodiments of the invention are not limited to any particular type of device or network configuration. Any number of devices, including client devices, and other devices, may be included in a network implementing an embodiment of the invention.

A. Binary Interest Vector Retrieval

Retrieval of an appropriate binary interest vector may be implemented in a number of ways within the embodiments of this invention. FIG. 7 illustrates an example method 700 of retrieving a binary interest vector in response to a user request to view Web page information. At step 702, a request for Web page information is received from a client device. In the example network arrangement 600 of FIG. 6, a user of client device 602 requests information for Web page 624 from server device 620 through Web browser 604.

At step 704, retrieval of a binary interest vector associated with a user profile is attempted. For example, server device 620 causes content targeting system 650 to locate a binary interest vector associated with a user profile. Content targeting system 650 first determines whether the user of client device 602 is logged onto a user profile. If the user is logged onto a user profile, then content targeting system 650 determines whether client device 602 has a binary interest vector, such as binary interest vector 640, in storage 608 that is associated with the user profile or whether storage 630 associated with server device 620 has a binary interest vector, such as binary interest vector 642, associated with the user profile.

In the context of the above example, if the user is not logged onto a user profile, or if content targeting system 650 does not locate a binary interest vector associated with the user profile that the user is logged into, then, at step 706, retrieval of a binary interest vector associated with the client device is attempted. For example, server device 620 causes content targeting system 650 to locate a binary interest vector associated with client device 602. Content targeting system 650 determines a unique identifier of client device 602, such as the IP address and/or the MAC address of client device 602, and determines if binary interest vector 640 or binary interest vector 642 are associated with the unique identifier of client device 602.

In the context of the above example, if content targeting system 650 does not locate a binary interest vector associated with client device 602, then, at step 708, a binary interest vector is created to associate with the user profile or client device. In one embodiment of the invention, if the user is logged into a user profile and no binary interest vector was found associated with that user profile, then the server creates a binary interest vector to associate with the user profile. If the user is not logged into a user profile, then the server creates a binary interest vector associated with a unique identifier of the client device. The created binary interest vector is saved to the appropriate location on a client machine, such as at storage 608, or on a server, such as at storage 630.

In this embodiment of the invention, creating a binary interest vector associated with a user profile is preferred to creating a binary interest vector associated with a client device because the former records information about a particular user, and is more helpful in selecting content tailored to the particular user. However, the server may create a binary interest vector for a client device with or without an applicable user profile within certain embodiments of the invention.

At step 710, selection of a particular content item to provide to the user is based on other indicators of user interest. Selection of the particular content item is based on other indicators of user interest, such as the content of pages that the user has viewed recently, because the newly created binary interest vector does not contain any information about user interest. Updating a binary vector to indicate user interest is described in further detail below.

If a binary interest vector that is associated with a user profile of the user or the client device of the user is located, then at step 712, a particular content item to provide to the user is selected based on the obtained binary interest vector.

B. Updating the Structure

If there is an update to the structure of a binary interest vector, a server may update the structure of the existing binary interest vector stored at a client or at a server without losing the information stored in the binary interest vector. In one embodiment of the invention, if the binary interest vector is stored at the server, e.g., binary interest vector 642 at storage 630, then the server may update the structure of binary interest vector 642 at any time.

Figure 8B:
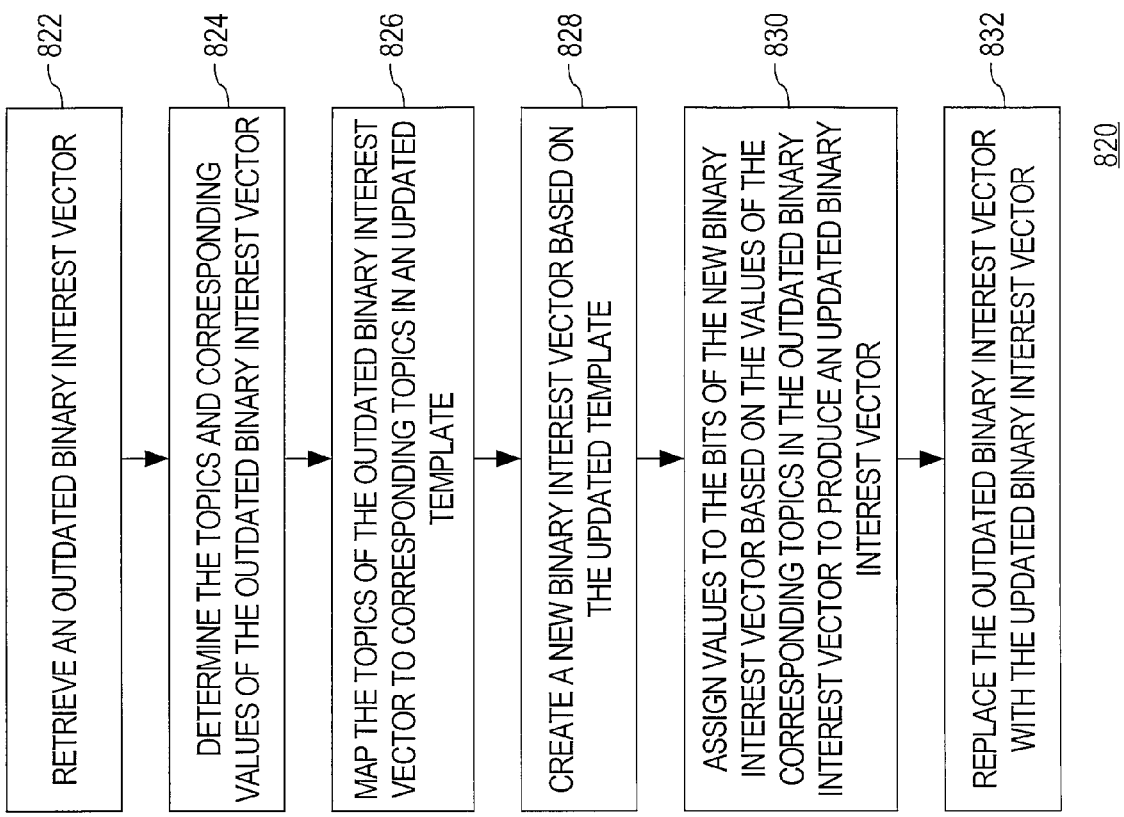
FIG. 8B illustrates an example method of updating the structure of a binary interest vector.
Figure 8A:
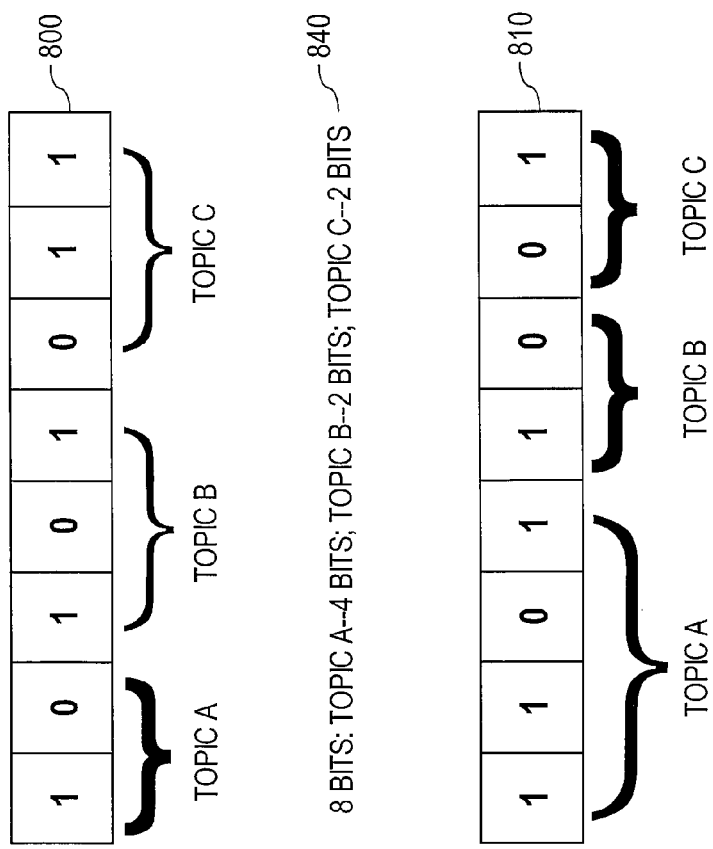
FIG. 8A illustrates a block diagram of an outdated version of a binary interest vector, an updated version of a binary interest vector, and a template for a binary interest vector.

FIG. 8A illustrates a block diagram of an outdated version of a binary interest vector 800 and an updated version of a binary interest vector 810 as well as binary interest vector template 840. FIG. 8B illustrates an example method 820 of updating a binary interest vector. According to example method 820 at step 822, an outdated binary interest vector is retrieved. For example, binary interest vector 800 is retrieved as an outdated binary interest vector.

At step 824, the topics and corresponding values of the outdated binary interest vector are determined. For example, binary interest vector 800 has the following topics and corresponding values: topic A has the binary value 10; topic B has the binary value 101; and topic C has the binary value 011. In this example, the values of the topics are determined based on linear concatenation. However, any method of valuing the bits corresponding to a particular topic may be used within the embodiments of this invention, including normalization.

At step 826, the topics of the outdated binary interest vector are mapped to corresponding topics in an updated template. For example, template 840 is an example of a template that may be used to represent a binary interest vector. Template 840 includes eight bits. The first four bits are dedicated to topic A, the next two bits are dedicated to topic B, and the last two bits are dedicated to topic C. Topics A, B, and C in template 840 correspond directly to topics A, B, and C in binary interest vector 800, respectively.

At step 828, a new binary interest vector is created based on the updated template. For example, binary interest vector 810 is created, which conforms to template 840. At step 830, values are assigned to the bits of the new binary interest vector based on the values of the corresponding topics in the outdated binary interest vector to produce an updated binary interest vector. For example, the values for the bits of binary interest vector 810 are based on the values of the bits of binary interest vector 800. In this example, the value of topic A in binary interest vector 810, "1101", is proportional to the value of topic A in binary interest vector 800, "10", etc. Values for the bits in the updated binary interest vector may be assigned in any number of ways within the embodiments of the invention.

At step 832, the outdated binary interest vector is replaced with the updated binary interest vector. In the preceding example, binary interest vector 800 is replaced with binary interest vector 810 on the server and/or the client.

For ease of illustration, binary interest vectors 800 and 810 have the same number of bits and the same topics: A, B, and C. However, a particular binary interest vector may be updated to include more or less bits, and more or less topics, in any combination.

C. Versioning

In another embodiment of the invention, different versions of binary interest vectors are indicated by version identifiers. For example, a portion of the bits of a binary interest vector may be used to represent a version number. As another example, a binary interest vector may be associated with a version identifier in a database, or at a user profile, etc. In this embodiment of the invention, the template to which a binary interest vector conforms is determined based on the version identifier.

Figure 9:
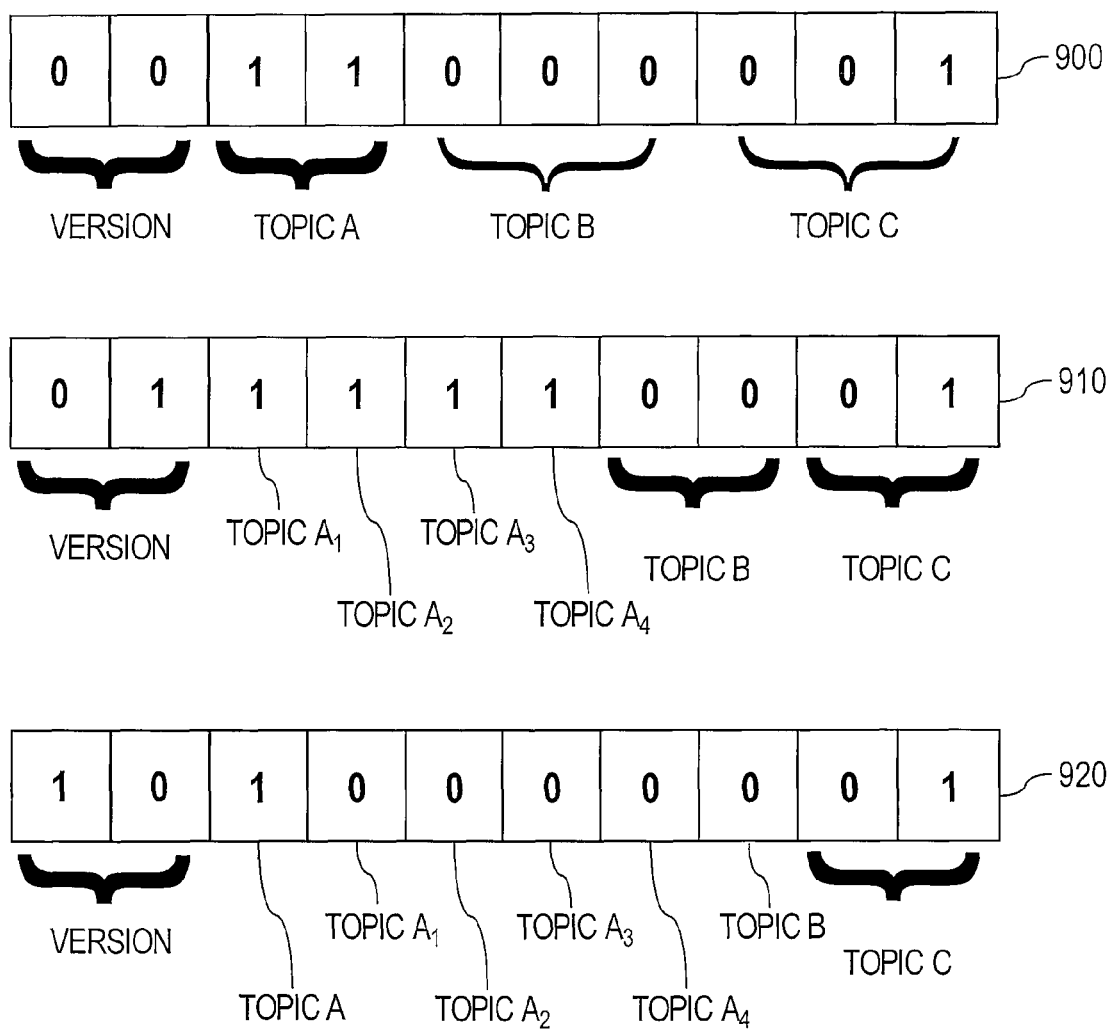
FIG. 9 is a block diagram that illustrates example versions of binary interest vectors.

Versions of binary interest vectors may be used to further tailor the information in a binary interest vector to user interest. FIG. 9 is a block diagram that illustrates example versions of binary interest vectors. To illustrate, binary interest vector 900 is associated with the user profile of a particular user. In this example, binary interest vector 900 is a general version of a bar code, indicated by version value 00, and conforms to the following format: 10 bits: version—2 bits; topic A—2 bits; topic B—3 bits; topic C—3 bits. As indicated by example binary interest vector 900, the particular user is very interested in topic A, which has a binary value of 11, and significantly less interested in topics B and C, with the binary values of 0, and 1, respectively.

A provider may replace binary interest vector 900 with a different version of a binary interest vector, such as binary interest vector 910, according to certain embodiments of the invention. The provider may make such a replacement based on the levels of interest denoted by the original binary interest vector, or because of market factors or changing information needs, etc.

Binary interest vector 910 has a version value of 01, which indicates that the vector conforms to the following format: 10 bits: version—2 bits; topic $A_1$—1 bit; topic $A_2$—1 bit; topic $A_3$—1 bit; topic $A_4$—1 bit; topic B—2 bits; topic C—2 bits. Thus, binary interest vector 910 has more information about sub-topics $A_1$-$A_4$ of topic A and less information about topics B and C, about which the particular user has little interest. Binary interest vector 910 indicates that the particular user is interested in all of the sub-topics of A, i.e., topics $A_1$-$A_4$. This information is adjusted based on user activity, as discussed in further detail below. A provider may alternatively set the initial value of topics that were not in a previous version of a binary interest vector for a particular user with other initial values, such as zero.

Alternate versions of binary interest vectors may include sub-categories of topics that are also represented in the binary interest vector. For example, binary interest vector 920 has a version identifier 10, which includes information on topic A as well as sub-categories of topic A, i.e., topics $A_1$-$A_4$.

D. Overwrites and Privacy

If a provider or a user wants to ensure that a particular topic represented in a binary interest vector receives a particular kind of treatment, then the provider or the user may cause the value for the topic to be overwritten in the binary interest vector. For example, a particular user is known to be underage and a provider has a policy of never displaying advertisements for tobacco to users that are underage. If one of the topics included in a binary interest vector associated with the particular underage user is "tobacco", then the provider may cause that the value in the binary interest vector for "tobacco" is set to zero each time the particular user logs in. Therefore, even if the particular user expresses interest in tobacco, the binary interest vector will not reflect that interest, and tobacco content will not be selected for that particular user. A provider may also update the binary interest vector template for an underage user to a template that excludes "tobacco" from the interest topics, or which includes a bit that indicates that the user is underage.

A provider may overwrite values of a binary interest vector at any time and to any value within certain embodiments of the invention. For example, a provider may determine that every user within a certain age range is interested in car insurance. To reflect this determination, the provider may overwrite values associated with the topic "car insurance" to be non-zero for users within the age range. Such overwrites may occur only once, or may occur every time a binary interest vector is retrieved or stored, etc.

Also, a user may indicate, i.e., through a user profile, that the user does not wish to view advertisements about television. In response, the provider may cause that the value associated with the topic "television" in a binary interest vector associated with the user be set to zero. Additionally, the provider may replace a binary interest vector, associated with the user, with a binary interest vector that has a structure that reflects the user's desire to not view advertisements about television.

Furthermore, if a user sets a privacy setting to high, or indicates to a provider that the user does not want information about the user to be tracked, then the provider may periodically overwrite all values of a binary interest vector associated with the user with zero. For example, the provider may overwrite the values of a binary interest vector associated with a user with a high privacy setting every time the user logs out of her corresponding user profile, etc.

VI. Updating User Interests

Binary interest vectors are updated based on information on user interest. Such information may be: (a) a user requesting or viewing Web pages or other documents; (b) query terms submitted by the user; (c) the inclusion of information on a particular topic in a list viewed by the user; (d) information provided by the user, i.e., in a user profile; etc. User interest may be inferred from these kinds of information.

Figure 10:
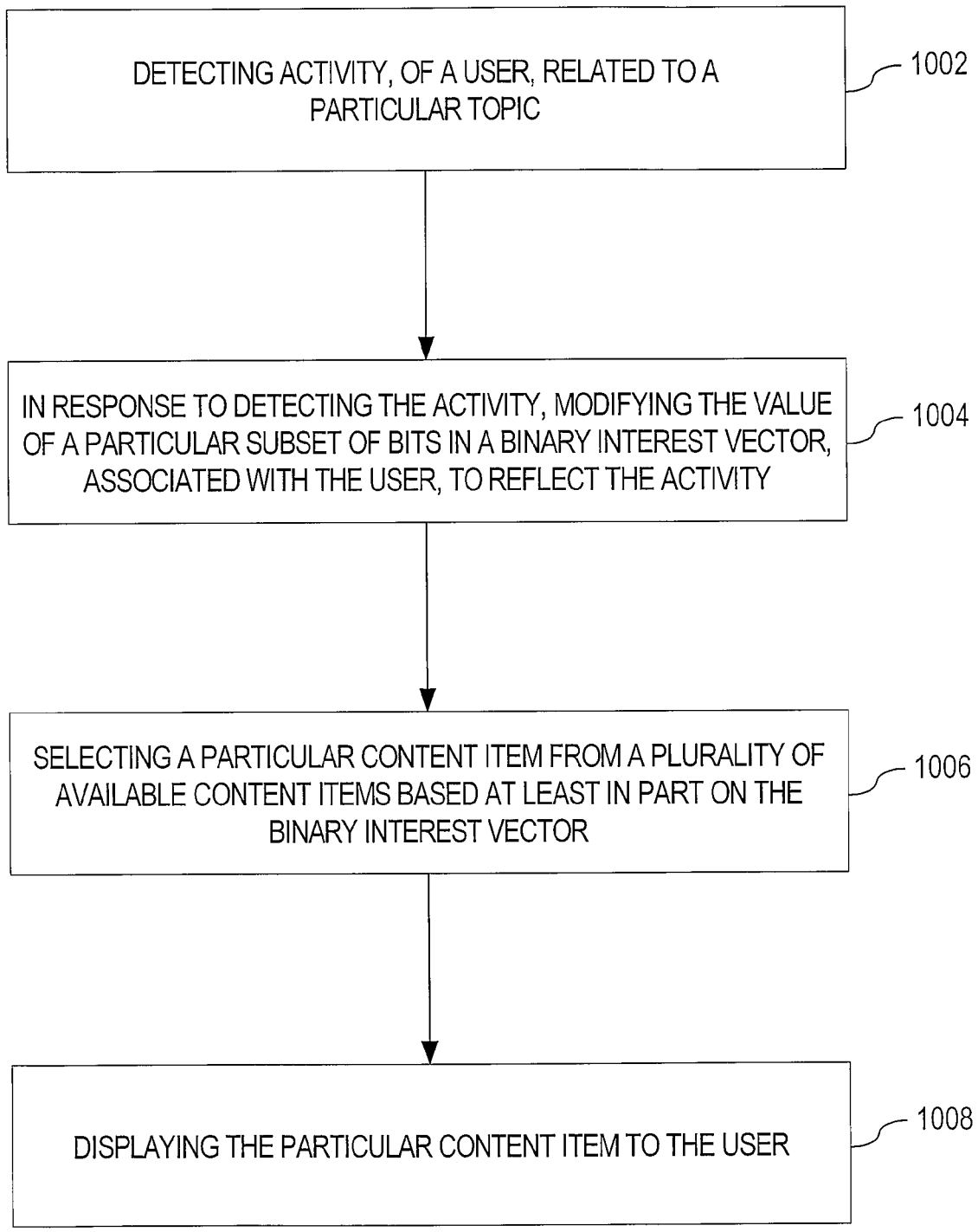
FIG. 10 illustrates an example method of updating user interest information represented by a binary interest vector and displaying content to a user based on the binary interest vector.

FIG. 10 illustrates an example method 1000 of updating a binary interest vector and displaying content to a user based on the binary interest vector. At step 1002, activity of a user that is related to a particular topic is detected. For example, a particular user views Web page 200 (FIG. 2) relating to travel.

At step 1004, in response to detecting the activity, the value of a particular subset of bits in a binary interest vector, associated with the user, is modified to reflect the activity. FIG. 11 is a block diagram that illustrates further example versions of binary interest vectors. For example, binary interest vector 1100 of FIG. 11 is determined to be associated with the particular user. In binary interest vector 1100, bits 1108-1116 represent interest in travel. Specifically, bit 1108 represents a general interest in travel, and bits 1110-1116 represent sub-categories of travel, i.e., travel to California, travel to Hawaii, travel to New York, and travel to Texas, respectively. Therefore, bits 1108 and 1110 may be modified to reflect the interest in travel evidenced by the particular user viewing Web page 200 featuring the Ritz Carlton at Half Moon Bay, Calif. As such, bit 1108 is modified with a value of "1" to represent a general interest in travel, and bit 1110 is modified with a value of "1" to represent an interest in traveling to California.

As a further example, a binary interest vector 1150 is associated with a particular user's profile, which conforms to the following template: 8 bits: sports in general—1 bit; baseball—1 bit; basketball—1 bit; soccer—1 bit; tennis—1 bit; water sports—1 bit; football—1 bit; rugby—1 bit. In this example, all of bits of the particular binary interest vector are initially set to zero. If the particular user places a bid on a soccer jersey through ebay.com, then it may be surmised that the user is interested in sports, and specifically interested in soccer. As a result, the bits corresponding to sports in general, bit 1152, and soccer, bit 1158, may be set to "1". Furthermore, a provider may have determined through analysis of user interest data that if a particular user is interested in soccer, the user is likely also interested in rugby. Based on this determination, bit 1166 corresponding to rugby may also be set to "1", as illustrated in binary interest vector 1150. If the user then logs into an anti-rugby blog, bit 1166 may then be set to "0" to reflect the user activity.

If the user views Web content through client device 602 (FIG. 6), then information on user activity may be gathered by server device 620, by content targeting system 650, by an application running on client device 602, or by any other appropriate information-gathering system.

If a binary interest vector is stored at storage 608 on client device 602, i.e., binary interest vector 640, then binary interest vector 640 may be updated at the end of a session with Web browser 604, periodically while the user browses the Internet, such as every X minutes, or every time the user visits a new page. However, as mentioned previously, a binary interest vector may be stored and managed remote from client device 602, such as at server device 620.

At step 1006, a particular content item from a plurality of available content items is selected based at least in part on the binary interest vector. Continuing with the previous travel example, binary interest vector 1100 indicates that the user associated therewith has an interest in food and an interest in travel, especially to California. As such, a content item relating to food or travel would probably be selected to fill the spot for tailored content 202 in Web page 200, if available. At step 1008, the particular content item is displayed to the user.

VII. Alternative Implementations

Binary interest vectors may be useful in many applications in addition to presenting targeted advertisements to users. Specifically, the information in binary interest vectors may be utilized to help a user find movies or music in which the user might be interested. A binary interest vector may also be used in social networking, e.g., to help the user find groups that discuss topics in which the user may be interested, etc.

VIII. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
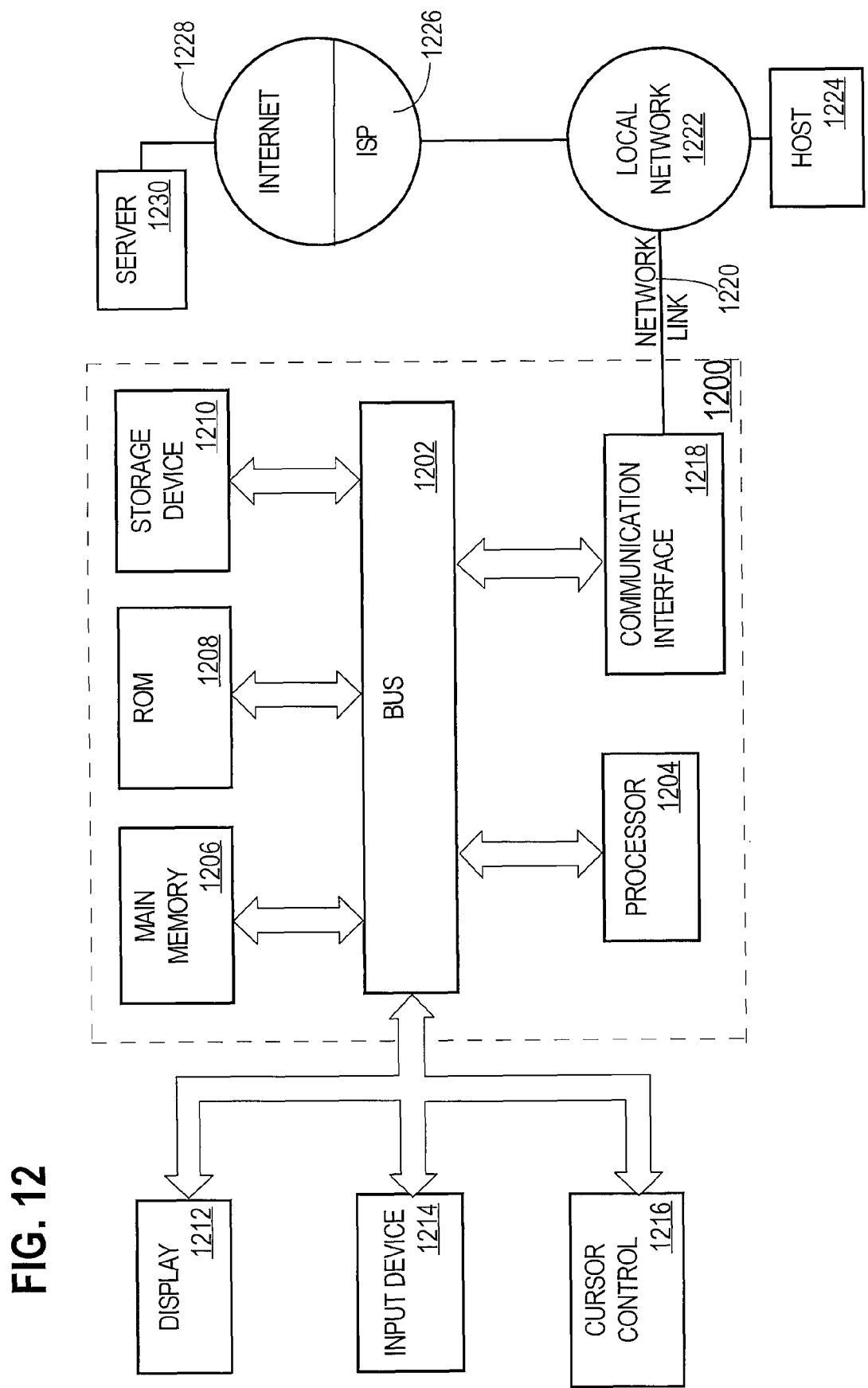
FIG. 12 is a block diagram of a computer system on which embodiments of the invention may be implemented.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method comprising:
   detecting first activity, of a user associated with a particular entity, said first activity related to a first topic of a set of topics;
   in response to detecting the first activity, modifying a first subset of bits, of a first set of bits associated with the particular entity, to reflect the first activity related to the first topic;
   detecting second activity of the user, said second activity related to a second topic of the set of topics;
   in response to detecting the second activity, modifying a second subset of bits, of the first set of bits, to reflect the second activity related to the second topic;
   wherein the first subset of bits is distinct from the second subset of bits;
   wherein the position of each bit of the first subset of bits indicates which topic of the set of topics that the first subset of bits reflects;
   wherein the position of each bit of the second subset of bits indicates which topic of the set of topics that the second subset of bits reflects;
   wherein a quantity of the first subset of bits is different than a quantity of the second subset of bits;
   determining a value for the first topic based, at least in part, on the first subset of bits:
   dividing the value for the first topic by a range of values that can be represented by the first subset of bits, to produce a normalized value for the first topic;
   selecting a particular content item from a plurality of available content items based at least in part on the first set of bits; and
   wherein the step of selecting the particular content item from the plurality of available content items further comprises selecting the particular content item based, at least in part, on the normalized value for the first topic;
   displaying the particular content item; and
   wherein the method is performed by one or more computing devices.

2. The computer-executed method of claim 1, wherein:
   the first set of bits is associated with a version identifier that identifies a first format;
   the first set of bits comprises a first plurality of distinct subsets of bits including the first and second subsets of bits; and
   a topic represented in a particular subset of bits of the first plurality of distinct subsets of bits is determined according to the first format.

3. The computer-executed method of claim 1, further comprising:
   determining a weight for the first topic;
   prior to selecting the particular content item, modifying the value for the first topic based at least in part on the weight;
   wherein the weight is based, at least in part, on a topic of a content item that is displayed to the user at the time that the particular content item is displayed to the user.

4. The computer-executed method of claim 1, wherein:
   the first activity indicates interest of the user in the first topic;
   the first activity is one of:
      (a) viewing, by the user, a document related to the first topic,
      (b) submitting, by the user, a query related to the first topic,
      (c) receiving, by the user, a set of search results including a document related to the first topic, and
      (d) submitting, by the user, information evidencing interest in the first topic; and
   the particular entity is one of:
      (a) a user profile,
      (b) an Internet Protocol (IP) address, and
      (c) a Media Access Control (MAC) address.

5. The computer-executed method of claim 2, further comprising:
   generating a second set of bits based on the first set of bits wherein the second set of bits conveys at least the same information as the first set of bits;
   associating the second set of bits with a second version identifier that identifies a second format that is different than the first format;
   wherein the second set of bits comprises a second plurality of distinct subsets of bits;
   wherein each subset of bits of the second plurality of distinct subsets of bits corresponds to a different topic of a second set of topics;

wherein a topic represented in each of the second plurality of distinct subsets of bits, respectively, is determined according to the second format.

6. The computer-executed method of claim 1, further comprising:
   receiving an overwrite value for a third subset of bits of the first set of bits; and
   modifying the bits of the third subset of bits to represent the overwrite value.

7. The computer-executed method of claim 1, further comprising:
   determining a privacy setting for the particular entity; and
   based on the privacy setting, performing one of:
      discarding the first set of bits, and
      overwriting each bit of the first set of bits with zero.

8. The computer-executed method of claim 1, wherein the step of modifying the first subset of bits, of the first set of bits associated with the particular entity, to reflect the first activity related to the first topic further comprises:
   determining whether the particular entity is associated with a particular set of bits;
   in response to determining that the particular entity is associated with a particular set of bits, checking whether a version of the particular set of bits is current;
   in response to determining that the version of the particular set of bits is not current:
      generating a modified set of bits based at least in part on the particular set of bits, and
      identifying the modified set of bits to be the first set of bits.

9. A computer-executed method comprising:
   detecting activity, of a user associated with a particular entity, that indicates interest in a particular topic of a set of topics;
   in response to detecting the activity, modifying a particular subset of bits of a set of bits that is associated with the particular entity, the step of modifying the particular subset of bits further comprising:
      identifying a format for the set of bits based, at least in part, on a version identifier that is associated with the set of bits, and
      determining that the particular topic is associated with the particular subset of bits based, at least in part, on the format for the set of bits;
   wherein the set of bits includes a plurality of distinct subsets of bits;
   wherein each distinct subset of bits of the plurality of distinct subsets of bits reflects activity related to a different topic of the set of topics;
   determining a value for the particular topic based, at least in part, on the particular subset of bits;
   dividing the value for the particular topic by a range of values that can be represented by the particular subset of bits, to produce a normalized value for the particular topic;
   selecting a particular content item from a plurality of available content items based at least in part on the set of bits;
   wherein the step of selecting the particular content item from the plurality of available content items further comprises selecting the particular content item based, at least in part, on the normalized value for the particular topic; and
   displaying the particular content item to the user; and
   wherein the method is performed by one or more computing devices.

10. The computer-executed method of claim 1, wherein the step of determining a value for the first topic bits further comprises adding values of each bit of the first subset of bits together.

11. The computer-executed method of claim 5, further comprising:
   identifying a third subset of bits of the second set of bits that represents the first topic; and
   causing the third subset of bits to represent a value that is proportional to a value represented by the first subset of bits.

12. The computer-executed method of claim 1, further comprising:
   generating a second set of bits based, at least in part, on the first set of bits;
   wherein the second set of bits comprises a plurality of distinct subsets of bits;
   causing a third subset of bits of the plurality of distinct subsets of bits to reflect a first interest value for a first subtopic of the first topic; and
   causing a fourth subset of bits of the plurality of distinct subsets of bits to reflect a second interest value for a second subtopic of the first topic.

13. A non-transitory computer-readable medium that stores instructions which, when executed by one or more processors, cause:
   detecting first activity, of a user associated with a particular entity, said first activity related to a first topic of a set of topics;
   in response to detecting the first activity, modifying a first subset of bits, of a first set of bits associated with the particular entity, to reflect the first activity related to the first topic;
   detecting second activity of the user, said second activity related to a second topic of the set of topics;
   in response to detecting the second activity, modifying a second subset of bits, of the first set of bits, to reflect the second activity related to the second topic;
   wherein the first subset of bits is distinct from the second subset of bits;
   wherein the position of each bit of the first subset of bits indicates which topic of the set of topics that the first subset of bits reflects;
   wherein the position of each bit of the second subset of bits indicates which topic of the set of topics that the second subset of bits reflects;
   wherein a quantity of the first subset of bits is different than a quantity of the second subset of bits;
   determining a value for the first topic based, at least in part, on the first subset of bits:
   dividing the value for the first topic by a range of values that can be represented by the first subset of bits, to produce a normalized value for the first topic;
   selecting a particular content item from a plurality of available content items based at least in part on the first set of bits; and
   wherein selecting the particular content item from the plurality of available content items further comprises selecting the particular content item based, at least in part, on the normalized value for the first topic; and
   displaying the particular content item.

14. The non-transitory computer-readable medium of claim 13, wherein:
   the first set of bits is associated with a version identifier that identifies a first format;

the first set of bits comprises a first plurality of distinct subsets of bits including the first and second subsets of bits; and a topic represented in a particular subset of bits of the first plurality of distinct subsets of bits is determined according to the first format.

15. The non-transitory computer-readable medium of claim 13, further comprising instructions for:

determining a weight for the first topic;

prior to selecting the particular content item, modifying the value for the first topic based at least in part on the weight;

wherein the weight is based, at least in part, on a topic of a content item that is displayed to the user at the time that the particular content item is displayed to the user.

16. The non-transitory computer-readable medium of claim 13, wherein:

the first activity indicates interest of the user in the first topic;

the first activity is one of:
  (a) viewing, by the user, a document related to the first topic,
  (b) submitting, by the user, a query related to the first topic,
  (c) receiving, by the user, a set of search results including a document related to the first topic, and
  (d) submitting, by the user, information evidencing interest in the first topic; and the particular entity is one of:
  (a) a user profile,
  (b) an Internet Protocol (IP) address, and
  (c) a Media Access Control (MAC) address.

17. The non-transitory computer-readable medium of claim 14, further comprising instructions for:

generating a second set of bits based on the first set of bits wherein the second set of bits conveys at least the same information as the first set of bits;

associating the second set of bits with a second version identifier that identifies a second format that is different than the first format;

wherein the second set of bits comprises a second plurality of distinct subsets of bits:

wherein each subset of bits of the second plurality of distinct subsets of bits corresponds to a different topic of a second set of topics; and wherein a topic represented in each of the second plurality of distinct subsets of bits, respectively, is determined according to the second format.

18. The non-transitory computer-readable medium of claim 13, further comprising instructions for:

receiving an overwrite value for a third subset of bits of the first set of bits; and modifying the bits of the third subset of bits to represent the overwrite value.

19. The non-transitory computer-readable medium of claim 13, further comprising instructions for:

determining a privacy setting for the particular entity; and based on the privacy setting, performing one of:

discarding the first set of bits, and overwriting each bit of the first set of bits with zero.

20. The non-transitory computer-readable medium of claim 13, wherein modifying the first subset of bits, of the first set of bits associated with the particular entity, to reflect the first activity related to the first topic further comprises:

determining whether the particular entity is associated with a particular set of bits;

in response to determining that the particular entity is associated with a particular set of bits, checking whether a version of the particular set of bits is current;

in response to determining that the version of the particular set of bits is not current:

generating a modified set of bits based at least in part on the particular set of bits, and identifying the modified set of bits to be the first set of bits.

21. A non-transitory computer-readable medium that stores instructions which, when executed by one or more processors, cause:

detecting activity, of a user associated with a particular entity, that indicates interest in a particular topic of a set of topics;

in response to detecting the activity, modifying a particular subset of bits of a set of bits that is associated with the particular entity;

wherein modifying the particular subset of bits further comprises:

identifying a format for the set of bits based, at least in part, on a version identifier that is associated with the set of bits, and determining that the particular topic is associated with the particular subset of bits based, at least in part, on the format for the set of bits;

wherein the set of bits includes a plurality of distinct subsets of bits;

wherein each distinct subset of bits of the plurality of distinct subsets of bits reflects activity related to a different topic of the set of topics;

determining a value for the particular topic based, at least in part, on the particular subset of bits;

dividing the value for the particular topic by a range of values that can be represented by the particular subset of bits, to produce a normalized value for the particular topic;

selecting a particular content item from a plurality of available content items based at least in part on the set of bits;

wherein selecting the particular content item from the plurality of available content items further comprises selecting the particular content item based, at least in part, on the normalized value for the particular topic; and displaying the particular content item to the user.

22. The non-transitory computer-readable medium of claim 13, wherein determining a value for the first topic further comprises adding values of each bit of the first subset of bits together.

23. The non-transitory computer-readable medium of claim 17, further comprising instructions for:

identifying a third subset of bits of the second set of bits that represents the first topic; and causing the third subset of bits to represent a value that is proportional to a value represented by the first subset of bits.

24. The non-transitory computer-readable medium of claim 13, further comprising instructions for:

generating a second set of bits based, at least in part, on the first set of bits;

wherein the second set of bits comprises a plurality of distinct subsets of bits;

causing a third subset of bits of the plurality of distinct subsets of bits to reflect a first interest value for a first subtopic of the first topic; and causing a fourth subset of bits of the plurality of distinct subsets of bits to reflect a second interest value for a second subtopic of the first topic.

* * * * *